(12) United States Patent
Stahl et al.

(10) Patent No.: US 10,914,957 B1
(45) Date of Patent: Feb. 9, 2021

(54) VIDEO COMPRESSION METHODS AND APPARATUS

(71) Applicant: Apple Inc., Cupertino, CA (US)

(72) Inventors: Geoffrey Stahl, San Jose, CA (US); Avi Bar-Zeev, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/844,869

(22) Filed: Apr. 9, 2020

Related U.S. Application Data

(63) Continuation of application No. 15/992,090, filed on May 29, 2018, now abandoned.

(60) Provisional application No. 62/512,365, filed on May 30, 2017.

(51) Int. Cl.
| | |
|---|---|
| *G06T 7/70* | (2017.01) |
| *G02B 27/01* | (2006.01) |
| *G06F 3/01* | (2006.01) |
| *G06F 3/0481* | (2013.01) |
| *H04N 19/139* | (2014.01) |
| *G06T 19/00* | (2011.01) |

(52) U.S. Cl.
CPC ......... *G02B 27/0172* (2013.01); *G06F 3/012* (2013.01); *G06F 3/04815* (2013.01); *G06T 7/70* (2017.01); *H04N 19/139* (2014.11); *G02B 2027/0138* (2013.01); *G02B 2027/0178* (2013.01); *G06T 19/006* (2013.01); *G06T 2207/30244* (2013.01)

(58) Field of Classification Search
USPC .................................................. 345/419, 690
See application file for complete search history.

(56) References Cited

U.S. PATENT DOCUMENTS

| | | | |
|---|---|---|---|
| 10,393,930 | B2 | 8/2019 | Tervo |
| 2004/0233989 | A1* | 11/2004 | Kobayashi ............. H04N 19/51 375/240.16 |
| 2011/0250962 | A1 | 10/2011 | Feiner et al. |

(Continued)

FOREIGN PATENT DOCUMENTS

| | | |
|---|---|---|
| WO | 201814040 | 1/2018 |
| WO | 201860207 | 5/2018 |

OTHER PUBLICATIONS

U.S. Appl. No. 15/992,090, filed May 29, 2018, Geoffrey Stahl et al.

*Primary Examiner* — Tony O Davis
(74) *Attorney, Agent, or Firm* — Robert C. Kowert; Kowert, Hood, Munyon, Rankin & Goetzel, P.C.

(57) ABSTRACT

A mixed reality system including a head-mounted display (HMD) and a base station. Information collected by HMD sensors may be transmitted to the base via a wired or wireless connection. On the base, a rendering engine renders frames including virtual content based in part on the sensor information, and an encoder compresses the frames according to an encoding protocol before sending the frames to the HMD over the connection. Instead of using a previous frame to estimate motion vectors in the encoder, motion vectors from the HMD and the rendering engine are input to the encoder and used in compressing the frame. The motion vectors may be embedded in the data stream along with the encoded frame data and transmitted to the HMD over the connection. If a frame is not received at the HMD, the HMD may synthesize a frame from a previous frame using the motion vectors.

21 Claims, 8 Drawing Sheets

(56) References Cited

U.S. PATENT DOCUMENTS

| | | |
|---|---|---|
| 2014/0015831 A1 | 1/2014 | Kim et al. |
| 2016/0209657 A1* | 7/2016 | Popovich ............... A61B 3/113 |
| 2017/0148206 A1 | 5/2017 | Donner et al. |
| 2017/0155924 A1 | 6/2017 | Gokhale et al. |
| 2017/0302719 A1 | 10/2017 | Chen et al. |
| 2018/0075654 A1 | 3/2018 | Vembar et al. |
| 2018/0075820 A1 | 3/2018 | Hicks et al. |
| 2018/0113309 A1* | 4/2018 | Robbins ................. G02B 6/124 |
| 2018/0192001 A1 | 7/2018 | Boyce |
| 2018/0275410 A1* | 9/2018 | Yeoh .................... H04N 13/344 |
| 2019/0004219 A1* | 1/2019 | Tervo ................. G02B 27/0101 |
| 2019/0045185 A1* | 2/2019 | Fu ........................ H04N 19/124 |
| 2019/0045213 A1* | 2/2019 | Raut .................... H04N 19/172 |
| 2019/0094955 A1* | 3/2019 | Zuber ..................... G01S 15/86 |
| 2019/0172868 A1* | 6/2019 | Chen ................. G02B 27/0172 |
| 2019/0199467 A1* | 6/2019 | Vu ........................ H04L 1/0017 |
| 2019/0212827 A1* | 7/2019 | Kin .................... G02B 27/0179 |
| 2019/0212828 A1* | 7/2019 | Kin .................... G06F 3/04815 |

* cited by examiner

VIDEO COMPRESSION METHODS AND APPARATUS

PRIORITY INFORMATION

This application is a continuation of U.S. patent application Ser. No. 15/992,090, filed May 29, 2018, which claims benefit of priority to U.S. Provisional Application Ser. No. 62/512,365, filed May 30, 2017, and which are incorporated herein by reference in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of virtual reality and/or the mixed environments of augmented reality may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for providing mixed reality views to users are described. Embodiments of a mixed reality system are described that may include a headset, helmet, goggles, or glasses worn by the user, referred to herein as a head-mounted display (HMD), and a separate computing device, referred to herein as a base station. The HMD and base station may each include communications technology that allows the HMD and base station to communicate and exchange data via a wired or wireless connection. The HMD may include world-facing sensors that collect information about the user's environment and user-facing sensors that collect information about the user. The information collected by the sensors may be transmitted to the base station via the connection. The base station may include software and hardware configured to generate and render frames that include virtual content based at least in part on the sensor information received from the HMD via the connection and to compress and transmit the rendered frames to the HMD for display via the connection.

Methods and apparatus are described that may be used in encoding, transmitting, and decoding frames rendered by the base station when sending frames rendered on the base station to the HMD via the connection. In particular, an encoding method is described that may reduce the time it takes to encode the rendered frames on the base station before transmitting the frames to the HMD via the connection.

In the encoding method, instead of using a previous frame as a reference frame to compute motion vectors for pixels or blocks of pixels of a current frame being encoded by the encoding method as is done in conventional encoders, motion vectors that have been determined from motion data captured by sensors on the HMD may be input to the encoding method and used during motion compensation in encoding the current frame. These motion vectors (referred to as head motion vectors) may indicate direction and velocity of objects in the environment based on predicted motion of the user's head determined from the motion data. In addition, in at least some embodiments, motion vectors for virtual content (referred to as virtual content motion vectors) that have been determined by the rendering application on the base station when rendering the virtual content may be input to the encoding method and used during motion compensation in encoding the current frame. These motion vectors may indicate direction and velocity of rendered virtual objects in the scene. Using the pre-determined motion vectors from the HMD and rendering application when encoding the current frame saves the time it would take to estimate the motion vectors using the previous frame.

In some embodiments, the motion information used by the encoder on the base station to encode a frame may be embedded in the data stream sent to the HMD along with the frame data. This motion information may be used on the HMD when rendering or compositing frames for display. For example, methods and apparatus are described that allow the HMD to synthesize a frame for display, for example if a current frame is not received from the base station. In these methods, motion vectors included in the data stream along with the frame data can be used by a rendering application on the HMD to synthesize a frame from a previously received frame by rotating or shifting content of the previous frame according to the motion vectors that were received in the data steam with the previous frame data.

Figure 1:
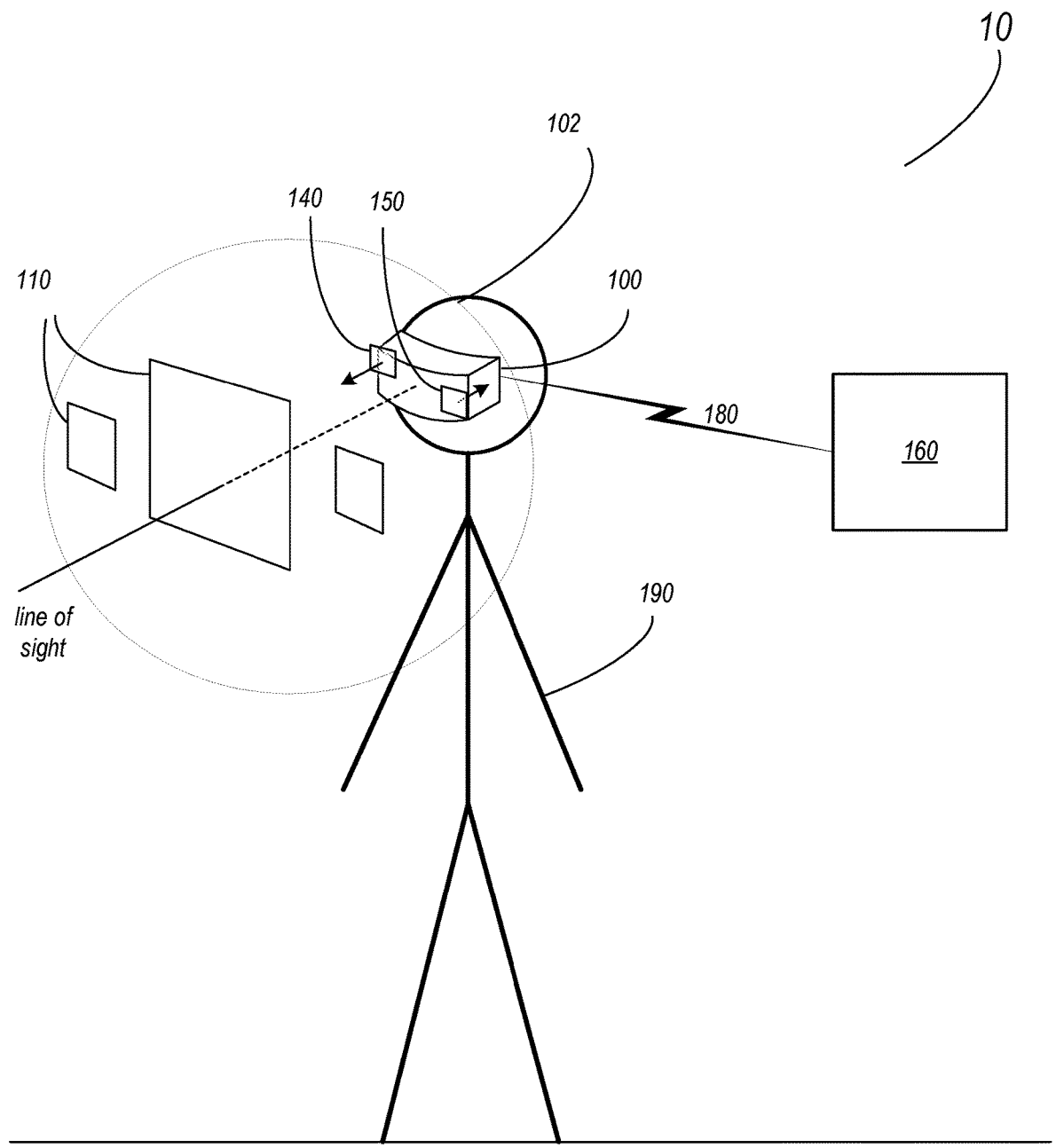
FIG. 1 illustrates a mixed reality system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing mixed reality views to users are described. Embodiments of a mixed reality system are described that may include a headset, helmet, goggles, or glasses worn by the user, referred to herein as a head-mounted display (HMD), and a separate computing device, referred to herein as a base station. The HMD may include world-facing sensors that collect information about the user's environment (e.g., video, depth information, lighting information, etc.), and user-facing sensors that collect information about the user (e.g., the user's expressions, eye movement, hand gestures, etc.). The information collected by the sensors may be transmitted to the base station via a wired or wireless connection. The base station may include software and hardware (e.g., processors (system on a chip (SOC), CPUs, image signal processors (ISPs), graphics processing units (GPUs), coder/decoders (codecs), etc.), memory, etc.) configured to generate and render frames that include virtual content based at least in part on the sensor information received from the HMD via the connection and to compress and transmit the rendered frames to the HMD for display via the connection.

Embodiments of the mixed reality system as described herein include a base station that provides more computing power than can be provided by conventional stand-alone systems. In some embodiments, the HMD and base station may each include wireless communications technology that allows the HMD and base station to communicate and exchange data via a wireless connection. The wireless connection between the HMD and the base station does not tether the HMD to the base station as in conventional tethered systems and thus allow users much more freedom of movement than do tethered systems. However, wired connections may be used in some embodiments.

In some embodiments, the mixed reality system may implement a proprietary wireless communications technology (e.g., 60 gigahertz (GHz) wireless technology) that provides a highly directional wireless link between the HMD and the base station. In some embodiments, the directionality and bandwidth of the wireless communication technology may support multiple HMDs communicating with the base station at the same time to thus enable multiple users to use the system at the same time in a co-located environment. However, other commercial (e.g., Wi-Fi, Bluetooth, etc.) or proprietary wireless communications technologies may be supported in some embodiments.

Two primary constraints to be considered on the connection between the HMD and the base station are bandwidth and latency. A target is to provide a high resolution, wide field of view (FOV) virtual display to the user at a frame rate (e.g., 60-120 frames per second (FPS)) that provides the user with a high-quality mixed reality view. Another target is to minimize latency between the time a video frame is captured by the HMD and the time a MR frame is displayed by the HMD.

Various methods and apparatus are described herein that may be used to maintain the target frame rate through the connection and to minimize latency in frame rendering, transmittal, and display. Methods and apparatus are described that may be used in encoding, transmitting, and decoding and processing frames rendered by the base station when sending frames rendered on the base station to the HMD via the connection. In particular, an encoding method is described that may reduce the time it takes to encode the rendered frames on the base station before transmitting the frames to the HMD via the connection.

In the encoding method, instead of using a previous frame as a reference frame to compute motion vectors for pixels or blocks of pixels of a current frame being encoded as is done in conventional encoders, motion vectors that have been determined from data captured by sensors on the HMD may be input to the encoding method and used during motion compensation in encoding the current frame. In addition, in at least some embodiments, motion vectors for virtual content that have been determined by the rendering application on the base station when rendering the virtual content may be input to the encoding method and used during motion compensation in encoding the current frame. Using the pre-determined motion vectors from the HMD and rendering application when encoding the current frame saves the time it would take to estimate the motion vectors using the previous frame.

In some embodiments, the motion information (e.g., head motion vectors and virtual content motion vectors) used by the encoder on the base station to encode a frame may be embedded in the data stream sent to the HMD along with the frame data. This motion information may be used on the HMD when rendering or compositing frames for display. For example, methods and apparatus are described that allow the HMD to synthesize a frame for display, for example if a current frame is not received from the base station. In these methods, motion vectors included in the data stream along with the frame data can be used by a rendering application on the HMD to synthesize a frame from a previously received frame by rotating or shifting content of the previous frame according to the motion vectors that were received in the data steam with the previous frame data.

FIG. 1 illustrates a mixed reality system 10, according to at least some embodiments. In some embodiments, a mixed reality system 10 may include a HMD 100 such as a headset, helmet, goggles, or glasses that may be worn by a user 190, and a base station 160 configured to render mixed reality frames including virtual content 110 for display by the HMD 100. In some embodiments, the HMD 100 and base station 160 may each include wireless communications technology that allows the HMD 100 and base station 160 to communicate and exchange data via a connection 180. However, in some embodiments, a wired connection between the HMD 100 and base station 160 may be used.

Figure 2:
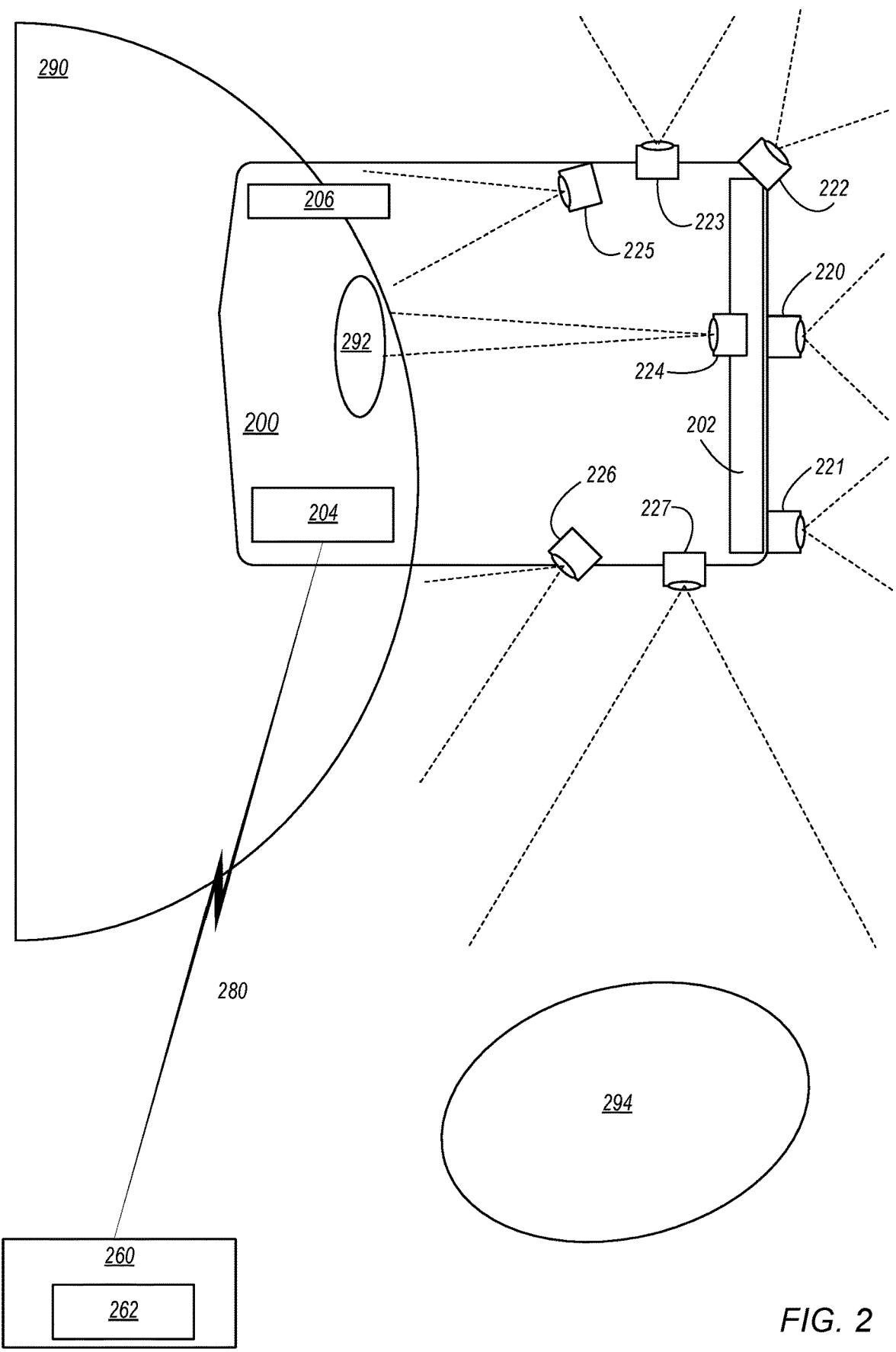
FIG. 2 illustrates world-facing and user-facing sensors of a head-mounted display (HMD) in a mixed reality system as illustrated in FIG. 1, according to some embodiments.

The HMD 100 may include world sensors 140 that collect information about the user 190's environment (video, depth information, lighting information, etc.), and user sensors 150 that collect information about the user 190 (e.g., the user's expressions, eye movement, gaze direction, hand gestures, etc.). Example sensors 140 and 150 are shown in FIG. 2. The HMD 100 may transmit at least some of the information collected by sensors 140 and 150 to a base station 160 of the mixed reality system 10 via connection 180. The base station 160 may render frames that include virtual content 110 based at least in part on the various information obtained from the sensors 140 and 150, compress the frames, and transmit the frames to the HMD 100 via the connection 180 for display to the user 190.

In some embodiments, virtual content 110 may be displayed to the user 190 in a 3D virtual view 102 by the HMD 100; different virtual objects may be displayed at different depths in the virtual space 102. The virtual content 110 may be overlaid on or composited in a view of the user 190's environment provided by the HMD 100. In some embodiments, rendered frames of virtual content received from the base station 160 are composited with frames from the HMD scene cameras on the HMD 100. In some embodiments, rendered frames of virtual content received from the base station 160 are overlaid on a real view of the environment.

HMD 100 may implement any of various types of virtual reality projection technologies. For example, HMD 100 may be a near-eye VR system that displays left and right images on screens in front of the user 190's eyes that are viewed by a subject, such as DLP (digital light processing), LCD (liquid crystal display) and LCoS (liquid crystal on silicon) technology VR systems. As another example, HMD 100 may be a direct retinal projector system that scans left and right images, pixel by pixel, to the subject's eyes. To scan the images, left and right projectors generate beams that are directed to left and right display screens (e.g., ellipsoid mirrors) located in front of the user 190's eyes; the display screens reflect the beams to the user's eyes. In some embodiments, the display screen may allow light from the user's environment to pass through while displaying virtual content provided by the projectors so that rendered frames of virtual content received from the base station 160 are overlaid on a real view of the environment as seen through the display screen. To create a three-dimensional (3D) effect, virtual content 110 at different depths or distances in the 3D virtual view 102 are shifted left or right in the two images as a function of the triangulation of distance, with nearer objects shifted more than more distant objects.

While not shown in FIG. 1, in some embodiments the mixed reality system 10 may include one or more other components. For example, the system may include a cursor control device (e.g., mouse) for moving a virtual cursor in the 3D virtual view 102 to interact with virtual content 110.

While FIG. 1 shows a single user 190 and HMD 100, in some embodiments the mixed reality system 10 may support multiple HMDs 100 communicating with the base station 160 at the same time to thus enable multiple users 190 to use the system at the same time in a co-located environment.

FIG. 2 illustrates world-facing and user-facing sensors of an example HMD 200, according to at least some embodiments. FIG. 2 shows a side view of an example HMD 200 with world and user sensors 220-227, according to some embodiments. Note that HMD 200 as illustrated in FIG. 2 is given by way of example, and is not intended to be limiting. In various embodiments, the shape, size, and other features of a HMD may differ, and the locations, numbers, types, and other features of the world and user sensors may vary.

As shown in FIG. 2, HMD 200 may be worn on a user 290's head so that the projection system displays 202 (e.g. screens and optics of a near-eye VR system, or reflective components (e.g., ellipsoid mirrors) of a direct retinal projector system) are disposed in front of the user 290's eyes 292. In some embodiments, a HMD 200 may include world sensors 220-223 that collect information about the user 290's environment (video, depth information, lighting information, etc.), and user sensors 224-227 that collect information about the user 290 (e.g., the user's expressions, eye movement, hand gestures, etc.). The HMD 200 may include one or more of various types of processors 204 (system on a chip (SOC), CPUs, image signal processors (ISPs), graphics processing units (GPUs), coder/decoders (codecs), etc.) that may, for example perform initial processing (e.g., compression) of the information collected by the sensors 220-227 and transmit the information to a base station 260 of the mixed reality system via a connection 280, and that may also perform processing (e.g., decoding/decompression, compositing, etc.) of compressed frames received from the base station 260 and provide the processed frames to the display subsystem for display.

In some embodiments, the connection 280 may be implemented according to a proprietary wireless communications technology (e.g., 60 gigahertz (GHz) wireless technology) that provides a highly directional wireless link between the HMD 200 and the base station 260. However, other commercial (e.g., Wi-Fi, Bluetooth, etc.) or proprietary wireless communications technologies may be used in some embodiments. In some embodiments, a wired connection between the HMD 200 and base station 260 may be used.

Figure 3:
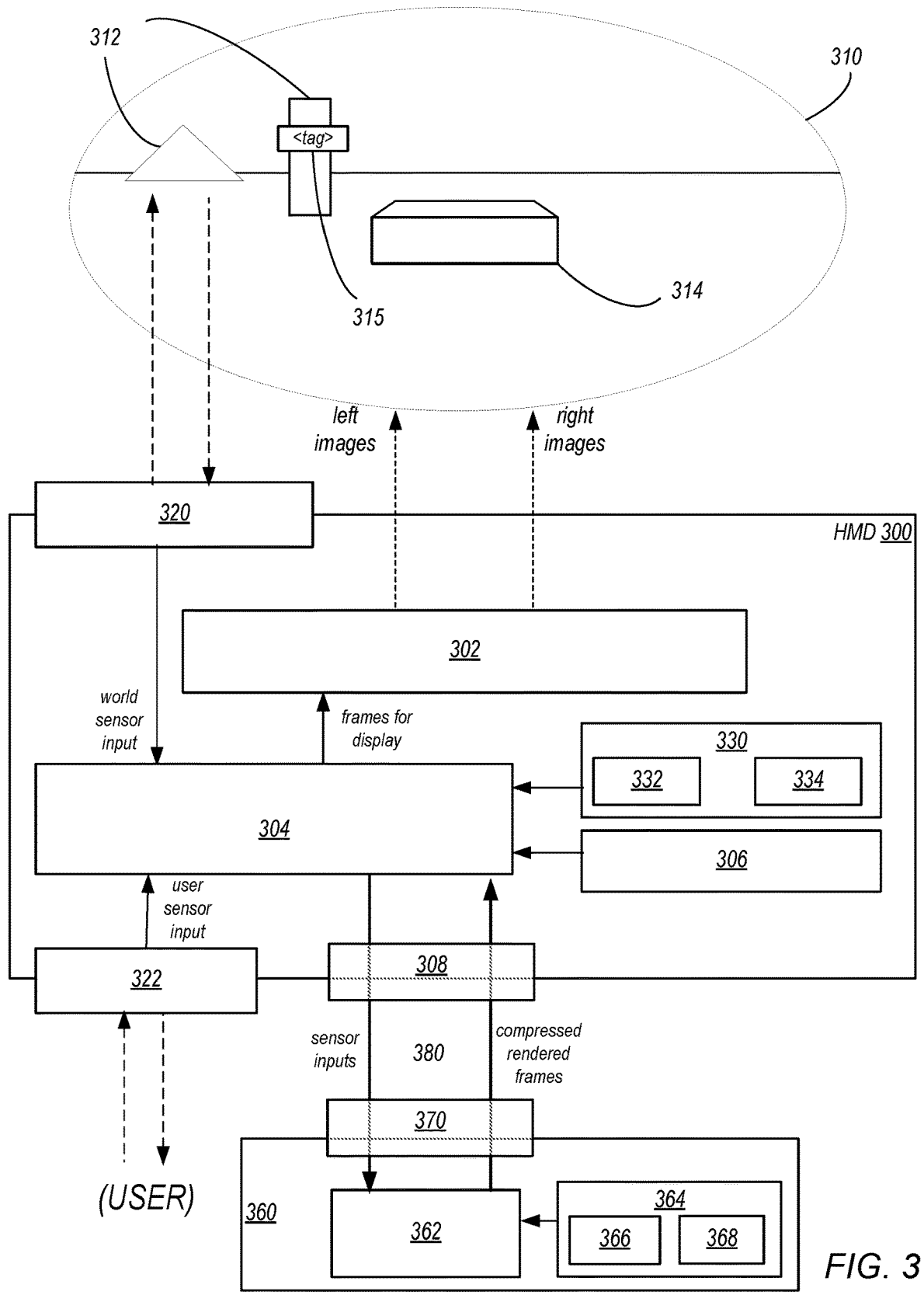
FIG. 3 is a block diagram illustrating components of a mixed reality system as illustrated in FIG. 1, according to some embodiments.
Figure 8:
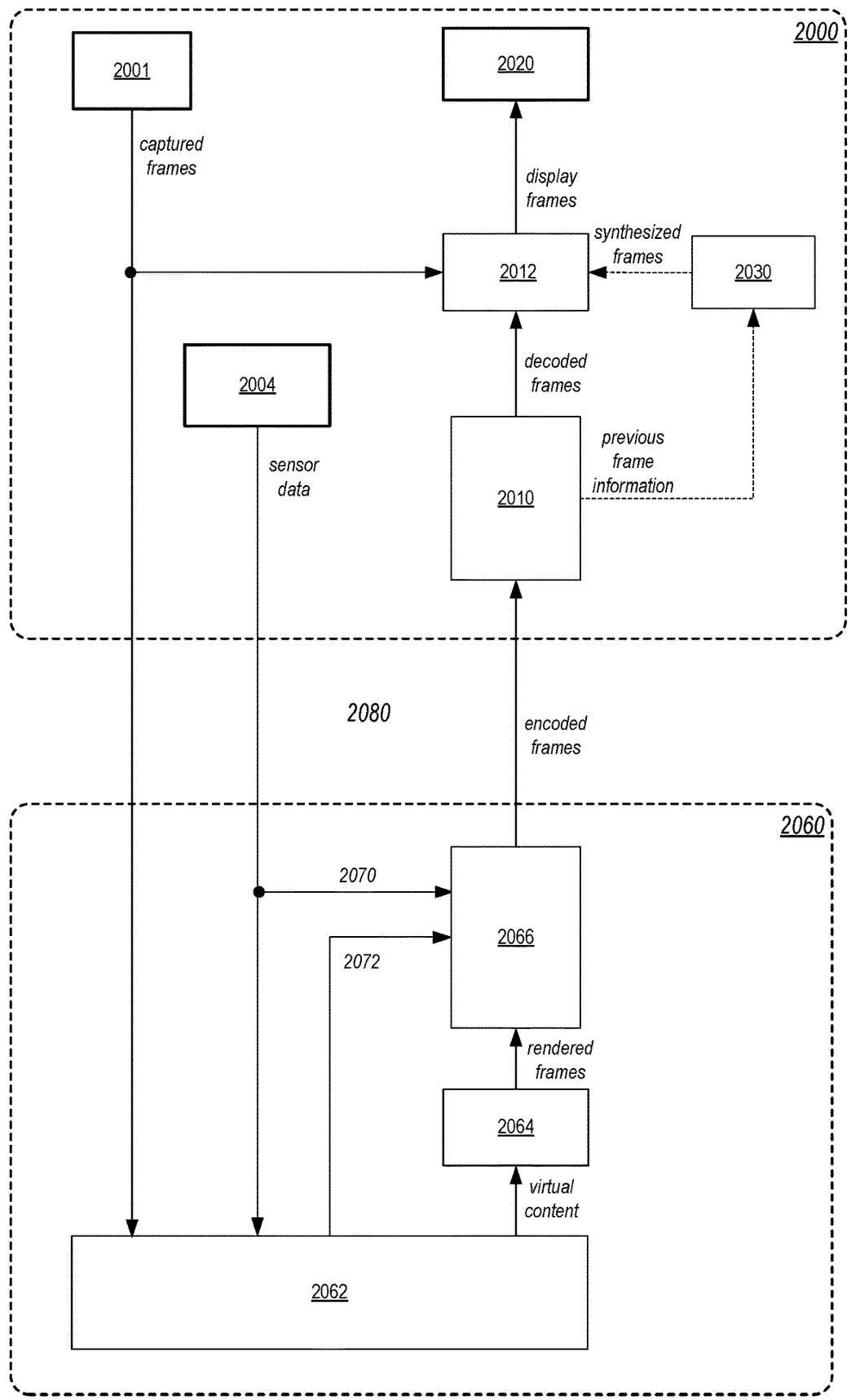
FIG. 8 is a block diagram illustrating functional components of and processing in an example mixed reality system as illustrated in FIGS. 1 through 7, according to some embodiments.

The base station 260 may be an external device (e.g., a computing system, game console, etc.) that is communicatively coupled to HMD 200 via the connection 280. The base station 260 may include one or more of various types of processors 262 (e.g., SOCs, CPUs, ISPs, GPUs, codecs, and/or other components for processing and rendering video and/or images). The base station 260 may render frames (each frame including a left and right image) that include virtual content based at least in part on the various inputs obtained from the sensors 220-227 via the connection 280, encode/compress the rendered frames, and transmit the compressed frames to the HMD 200 for processing and display to the left and right displays 202. FIGS. 3 and 8 further illustrate components and operations of a HMD 200 and base station 260 of a mixed reality system, according to some embodiments.

World sensors 220-223 may, for example, be located on external surfaces of a HMD 200, and may collect various information about the user's environment. In some embodiments, the information collected by the world sensors may be used to provide the user with a virtual view of their real environment. In some embodiments, the world sensors may be used to provide depth information for objects in the real environment. In some embodiments, the world sensors may be used to provide orientation and motion information for the user in the real environment. In some embodiments, the world sensors may be used to collect color and lighting information in the real environment.

In some embodiments, the world sensors may include one or more scene cameras 220 (e.g., RGB (visible light) video cameras) that capture high-quality video of the user's environment that may be used to provide the user 290 with a virtual view of their real environment. In some embodiments, video streams captured by cameras 220 may be compressed by the HMD 200 and transmitted to the base station 260 via connection 280. The frames may be decompressed and processed by the base station 260 at least in part according to other sensor information received from the HMD 200 via the connection 280 and used in rendering frames including virtual content; the rendered frames may then be compressed and transmitted to the HMD 200 via the connection 280 for processing and display to the user 290.

In some embodiments, if the connection 280 to the base station 200 is lost for some reason, at least some video frames captured by cameras 200 may be processed by processors 204 of HMD 200 to provide a virtual view of the real environment to the user 290 via display 202. This may, for example, be done for safety reasons so that the user 290 can still view the real environment that they are in even if the base station 260 is unavailable. In some embodiments, the processors 204 may render virtual content to be displayed in the virtual view, for example a message informing the user 290 that the connection 280 has been lost.

In some embodiments there may be two scene cameras 220 (e.g., a left and a right camera 220) located on a front surface of the HMD 200 at positions that are substantially in front of each of the user 290's eyes 292. However, in various embodiments, more or fewer scene cameras 220 may be used in a HMD 200 to capture video of the user 290's environment, and scene cameras 220 may be positioned at other locations. In an example non-limiting embodiment, scene cameras 220 may include high quality, high resolution RGB video cameras, for example 10 megapixel (e.g., 3072× 3072 pixel count) cameras with a frame rate of 60 frames per second (FPS) or greater, horizontal field of view (HFOV) of greater than 90 degrees, and with a working distance of 0.1 meters (m) to infinity.

In some embodiments, the world sensors may include one or more world mapping sensors 221 (e.g., infrared (IR) cameras with an IR illumination source, or Light Detection and Ranging (LIDAR) emitters and receivers/detectors) that, for example, capture depth or range information for objects and surfaces in the user's environment. The range information may, for example, be used in positioning virtual content to be composited into views of the real environment at correct depths. In some embodiments, the range information may be used in adjusting the depth of real objects in the environment when displayed; for example, nearby objects may be re-rendered to be smaller in the display to help the user in avoiding the objects when moving about in the environment. In some embodiments there may be one world mapping sensor 221 located on a front surface of the HMD 200. However, in various embodiments, more than one world mapping sensor 221 may be used, and world mapping sensor(s) 221 may be positioned at other locations. In an example non-limiting embodiment, a world mapping sensor 221 may include an IR light source and IR camera, for example a 1 megapixel (e.g., 1000×1000 pixel count) camera with a frame rate of 60 frames per second (FPS) or greater, HFOV of 90 degrees or greater, and with a working distance of 0.1 m to 1.5 m.

In some embodiments, the world sensors may include one or more head pose sensors 222 (e.g., IR or RGB cameras) that may capture information about the position, orientation, and/or motion of the user and/or the user's head in the environment. The information collected by head pose sensors 222 may, for example, be used to augment information collected by an inertial-measurement unit (IMU) 206 of the HMD 200. The augmented position, orientation, and/or motion information may be used in determining how to render and display virtual views of the user's environment and virtual content within the views. For example, different views of the environment may be rendered based at least in part on the position or orientation of the user's head, whether the user is currently walking through the environment, and so on. As another example, the augmented position, orientation, and/or motion information may be used to composite virtual content into the scene in a fixed position relative to the background view of the user's environment. In some embodiments there may be two head pose sensors 222 located on a front or top surface of the HMD 200. However, in various embodiments, more or fewer sensors 222 may be used, and sensors 222 may be positioned at other locations. In an example non-limiting embodiment, head pose sensors 222 may include RGB or IR cameras, for example 400×400 pixel count cameras, with a frame rate of 120 frames per second (FPS) or greater, wide field of view (FOV), and with a working distance of 1 m to infinity. The sensors 222 may include wide FOV lenses, and the two sensors 222 may look in different directions. The sensors 222 may provide low latency monochrome imaging for tracking head position and motion, and may be integrated with an IMU of the HMD 200 to augment head position and movement information captured by the IMU.

In some embodiments, the world sensors may include one or more light sensors 223 (e.g., RGB cameras) that capture lighting information (e.g., direction, color, and intensity) in the user's environment that may, for example, be used in rendering virtual content in the virtual view of the user's environment, for example in determining coloring, lighting, shadow effects, etc. for virtual objects in the virtual view. For example, if a red light source is detected, virtual content rendered into the scene may be illuminated with red light, and more generally virtual objects may be rendered with light of a correct color and intensity from a correct direction and angle. In some embodiments there may be one light sensor 223 located on a front or top surface of the HMD 200. However, in various embodiments, more than one light sensor 223 may be used, and light sensor 223 may be positioned at other locations. In an example non-limiting embodiment, light sensor 223 may include an RGB high dynamic range (HDR) video camera, for example a 500×500 pixel count camera, with a frame rate of 30 FPS, HFOV of 180 degrees or greater, and with a working distance of 1 m to infinity.

User sensors 224-227 may, for example, be located on external and internal surfaces of HMD 200, and may collect information about the user 290 (e.g., the user's expressions, eye movement, etc.). In some embodiments, the information collected by the user sensors may be used to adjust the collection of, and/or processing of information collected by, the world sensors 220-223 of the HMD 200. In some embodiments, the information collected by the user sensors 224-227 may be used to adjust the rendering of images to be projected, and/or to adjust the projection of the images by the projection system of the HMD 200. In some embodiments, the information collected by the user sensors 224-227 may be used in generating an avatar of the user 290 in the 3D virtual view projected to the user by the HMD 200. In some embodiments, the information collected by the user sensors 224-227 may be used in interacting with or manipulating virtual content in the 3D virtual view projected by the HMD 200.

In some embodiments, the user sensors may include one or more gaze tracking sensors 224 (e.g., IR cameras with an IR illumination source) that may be used to track position and movement of the user's eyes. In some embodiments, gaze tracking sensors 224 may also be used to track dilation of the user's pupils. In some embodiments, there may be two gaze tracking sensors 224, with each gaze tracking sensor tracking a respective eye 292. In some embodiments, the information collected by the gaze tracking sensors 224 may be used to adjust the rendering of images to be projected, and/or to adjust the projection of the images by the projection system of the HMD 200, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. Similarly, content of images in regions at which the user is not looking may be compressed more than content of the region around the point at which the user is currently looking, which may reduce bandwidth usage on the connection 280 and help to maintain the latency target. In some embodiments, the information collected by the gaze tracking sensors 224 may be used to match direction of the eyes of an avatar of the user 290 to the direction of the user's eyes. In some embodiments, brightness of the projected images may be modulated based on the user's pupil dilation as determined by the gaze tracking sensors 224. In some embodiments there may be two gaze tracking sensors 224 located on an inner surface of the HMD 200 at positions such that the sensors 224 have views of respective ones of the user 290's eyes 292. However, in various embodiments, more or fewer gaze tracking sensors 224 may be used in a HMD 200, and sensors 224 may be positioned at other locations. In an example non-limiting embodiment, each gaze tracking sensor 224 may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the user sensors may include one or more eyebrow sensors 225 (e.g., IR cameras with IR illumination) that track expressions of the user's eyebrows/forehead. In some embodiments, the user sensors may include one or more lower jaw tracking sensors 226 (e.g., IR cameras with IR illumination) that track expressions of the user's mouth/jaw. For example, in some embodiments, expressions of the brow, mouth, jaw, and eyes captured by sensors 224, 225, and 226 may be used to simulate expressions on an avatar of the user 290 in the virtual space, and/or to selectively render and composite virtual content for viewing by the user based at least in part on the user's reactions to the content projected in the 3D virtual view. In some embodiments there may be two eyebrow sensors 225 located on an inner surface of the HMD 200 at positions such that the sensors 225 have views of the user 290's eyebrows and forehead. However, in various embodiments, more or fewer eyebrow sensors 225 may be used in a HMD 200, and sensors 225 may be positioned at other locations than those shown. In an example non-limiting embodiment, each eyebrow sensor 225 may include an IR light source and IR camera, for example a 250×250 pixel count camera with a frame rate of 60 FPS, HFOV of 60 degrees, and with a working distance of approximately 5 mm. In some embodiments, images from the two sensors 225 may be combined to form a stereo view of the user's forehead and eyebrows.

In some embodiments, the user sensors may include one or more lower jaw tracking sensors 226 (e.g., IR cameras with IR illumination) that track expressions of the user's jaw and mouth. In some embodiments there may be two lower jaw tracking sensors 226 located on an inner surface of the HMD 200 at positions such that the sensors 226 have views of the user 290's lower jaw and mouth. However, in various embodiments, more or fewer lower jaw tracking sensors 226 may be used in a HMD 200, and sensors 226 may be positioned at other locations than those shown. In an example non-limiting embodiment, each lower jaw tracking sensor 226 may include an IR light source and IR camera, for example a 400×400 pixel count camera with a frame rate of 60 FPS, HFOV of 90 degrees, and with a working distance of approximately 30 mm. In some embodiments, images from the two sensors 226 may be combined to form a stereo view of the user's lower jaw and mouth.

In some embodiments, the user sensors may include one or more hand sensors 227 (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user 290 in the virtual space. As another example, the user's detected hand and finger gestures may be used to determine interactions of the user with virtual content in the virtual space, including but not limited to gestures that manipulate virtual objects, gestures that interact with virtual user interface elements displayed in the virtual space, etc. In some embodiments there may be one hand sensor 227 located on a bottom surface of the HMD 200. However, in various embodiments, more than one hand sensor 227 may be used, and hand sensor 227 may be positioned at other locations. In an example non-limiting embodiment, hand sensor 227 may include an IR light source and IR camera, for example a 500×500 pixel count camera with a frame rate of 120 FPS or greater, HFOV of 90 degrees, and with a working distance of 0.1 m to 1 m.

FIG. 3 is a block diagram illustrating components of an example mixed reality system, according to at least some embodiments. In some embodiments, a mixed reality system may include a HMD 300 such as a headset, helmet, goggles, or glasses, and a base station 360 (e.g., a computing system, game console, etc.).

HMD 300 may include a display 302 component or subsystem via which virtual content may be displayed to the user in a 3D virtual view 310; different virtual content (e.g., tags 315 and/or objects 316) may be displayed at different depths in the virtual space. The virtual content may be overlaid on or composited in a view of the user's environment provided by the HMD 300. In some embodiments, rendered frames of virtual content received from the base station 360 are composited with frames from the HMD scene cameras on the HMD 300. In some embodiments, rendered frames of virtual content received from the base station 360 are overlaid on a real view of the environment.

Display 302 may implement any of various types of virtual reality projector technologies. For example, the HMD 300 may include a near-eye VR projector that displays frames including left and right images on screens that are viewed by a user, such as DLP (digital light processing), LCD (liquid crystal display) and LCoS (liquid crystal on silicon) technology projectors. As another example, the HMD 300 may include a direct retinal projector that scans frames including left and right images, pixel by pixel, directly to the user's eyes via a reflective surface (e.g., reflective eyeglass lenses). In some embodiments, the reflective components may allow light from the user's environment to pass through while reflecting light emitted by the projectors so that rendered frames of virtual content received from the base station 160 are overlaid on a real view of the environment as seen through the reflective components. To create a three-dimensional (3D) effect in 3D virtual view 310, objects at different depths or distances in the two images are shifted left or right as a function of the triangulation of distance, with nearer objects shifted more than more distant objects.

HMD 300 may also include a controller 304 comprising one or more processors configured to implement HMD-side functionality of the mixed reality system as described herein. In some embodiments, HMD 300 may also include a memory 330 configured to store software (code 332) of the HMD component of the mixed reality system that is executable by the controller 304, as well as data 334 that may be used by the code 332 when executing on the controller 304.

In various embodiments, controller 304 may be a uniprocessor system including one processor, or a multiprocessor system including several processors (e.g., two, four, eight, or another suitable number). Controller 304 may include central processing units (CPUs) configured to implement any suitable instruction set architecture, and may be configured to execute instructions defined in that instruction set architecture. For example, in various embodiments controller 304 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 304 may employ any microarchitecture, including scalar, superscalar, pipelined, superpipelined, out of order, in order, speculative, non-speculative, etc., or combinations thereof. Controller 304 may include circuitry to implement microcoding techniques. Controller 304 may include one or more processing cores each configured to execute instructions. Controller 304 may include one or more levels of caches, which may employ any size and any configuration (set associative, direct mapped, etc.). In some embodiments, controller 304 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 304 may include one or more other components for processing and rendering video and/or images, for example image signal processors (ISPs), coder/decoders (codecs), etc. In some embodiments, controller 304 may include at least one system on a chip (SOC).

Memory 330 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAIVIBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 300 may include at least one inertial-measurement unit (IMU) 306 configured to detect position, orientation, and/or motion of the HMD 300, and to provide the detected position, orientation, and/or motion data to the controller 304 of the HMD 300.

In some embodiments, the HMD 300 may include world sensors 320 that collect information about the user's environment (video, depth information, lighting information, etc.), and user sensors 322 that collect information about the user (e.g., the user's expressions, eye movement, hand gestures, etc.). The sensors 320 and 322 may provide the collected information to the controller 304 of the HMD 300. Sensors 320 and 322 may include, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors. World and user sensors of an example HMD are shown in FIG. 2.

HMD 300 may also include one or more interfaces 308 configured to communicate with an external base station 360 via a connection 380 to send sensor inputs to the base station 360 and receive compressed rendered frames from the base station 360. In some embodiments, interface 308 may implement a proprietary wireless communications technology (e.g., 60 gigahertz (GHz) wireless technology) that provides a highly directional wireless connection 380 between the HMD 300 and the base station 360. However, other commercial (e.g., Wi-Fi, Bluetooth, etc.) or proprietary wireless communications technologies may be used in some embodiments. In some embodiments, interface 308 may implement a wired connection 380 between the HMD 300 and base station 360.

Base station 360 may be or may include any type of computing system or computing device, such as a desktop computer, notebook or laptop computer, pad or tablet device, smartphone, hand-held computing device, game controller, game system, and so on. Base station 360 may include a controller 362 comprising one or more processors configured to implement base-side functionality of the mixed reality system as described herein. Base station 360 may also include a memory 364 configured to store software (code 366) of the base station component of the mixed reality system that is executable by the controller 362, as well as data 368 that may be used by the code 366 when executing on the controller 362.

In various embodiments, controller 362 may be a uniprocessor system including one processor, or a multiprocessor system including several processors (e.g., two, four, eight, or another suitable number). Controller 362 may include central processing units (CPUs) configured to implement any suitable instruction set architecture, and may be configured to execute instructions defined in that instruction set architecture. For example, in various embodiments controller 362 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 362 may employ any microarchitecture, including scalar, superscalar, pipelined, superpipelined, out of order, in order, speculative, non-speculative, etc., or combinations thereof. Controller 362 may include circuitry to implement microcoding techniques. Controller 362 may include one or more processing cores each configured to execute instructions. Controller 362 may include one or more levels of caches, which may employ any size and any configuration (set associative, direct mapped, etc.). In some embodiments, controller 362 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 362 may include one or more other components for processing and rendering video and/or images, for example image signal processors (ISPs), coder/decoders (codecs), etc. In some embodiments, controller 362 may include at least one system on a chip (SOC).

Memory 364 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAIVIBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Base station 360 may also include one or more interfaces 370 configured to communicate with HMD 300 via a connection 380 to receive sensor inputs from the HMD 300 and send compressed rendered frames from the base station 360 to the HMD 300. In some embodiments, interface 370 may implement a proprietary wireless communications technology (e.g., 60 gigahertz (GHz) wireless technology) that provides a highly directional wireless connection 380 between the HMD 300 and the base station 360. In some embodiments, the directionality and band width (e.g., 60 GHz) of the wireless communication technology may support multiple HMDs 300 communicating with the base station 360 at the same time to thus enable multiple users to use the system at the same time in a co-located environment. However, other commercial (e.g., Wi-Fi, Bluetooth, etc.) or proprietary wireless communications technologies may be used in some embodiments. In some embodiments, interface 370 may implement a wired connection 380 between the HMD 300 and base station 360.

The base station 360 may be configured to render and transmit frames to the HMD 300 to provide a 3D virtual view 310 for the user based at least in part on world sensor 320 and user sensor 322 inputs received from the HMD 300. In some embodiments, rendered frames of virtual content received from the base station 360 are composited with frames from the HMD scene cameras on the HMD 300, for example as described in reference to FIG. 4. In these embodiments, the virtual view 310 may include renderings of the user's environment, including renderings of real objects 312 in the user's environment, based on video captured by one or more scene cameras (e.g., RGB (visible light) video cameras) that capture high-quality, high-resolution video of the user's environment in real time for display. The virtual view 310 may also include virtual content (e.g., virtual objects, 314, virtual tags 315 for real objects 312, avatars of the user, etc.) rendered by the base station 360 and composited with the 3D view of the user's real environment by the HMD 300. In some embodiments, instead of compositing the virtual content into video frames of the real environment, the virtual content in the rendered frames received from the base station 360 is overlaid on a real view of the environment as seen by the user through lenses of the HMD 300, for example as described in reference to FIG. 5.

Figure 4:
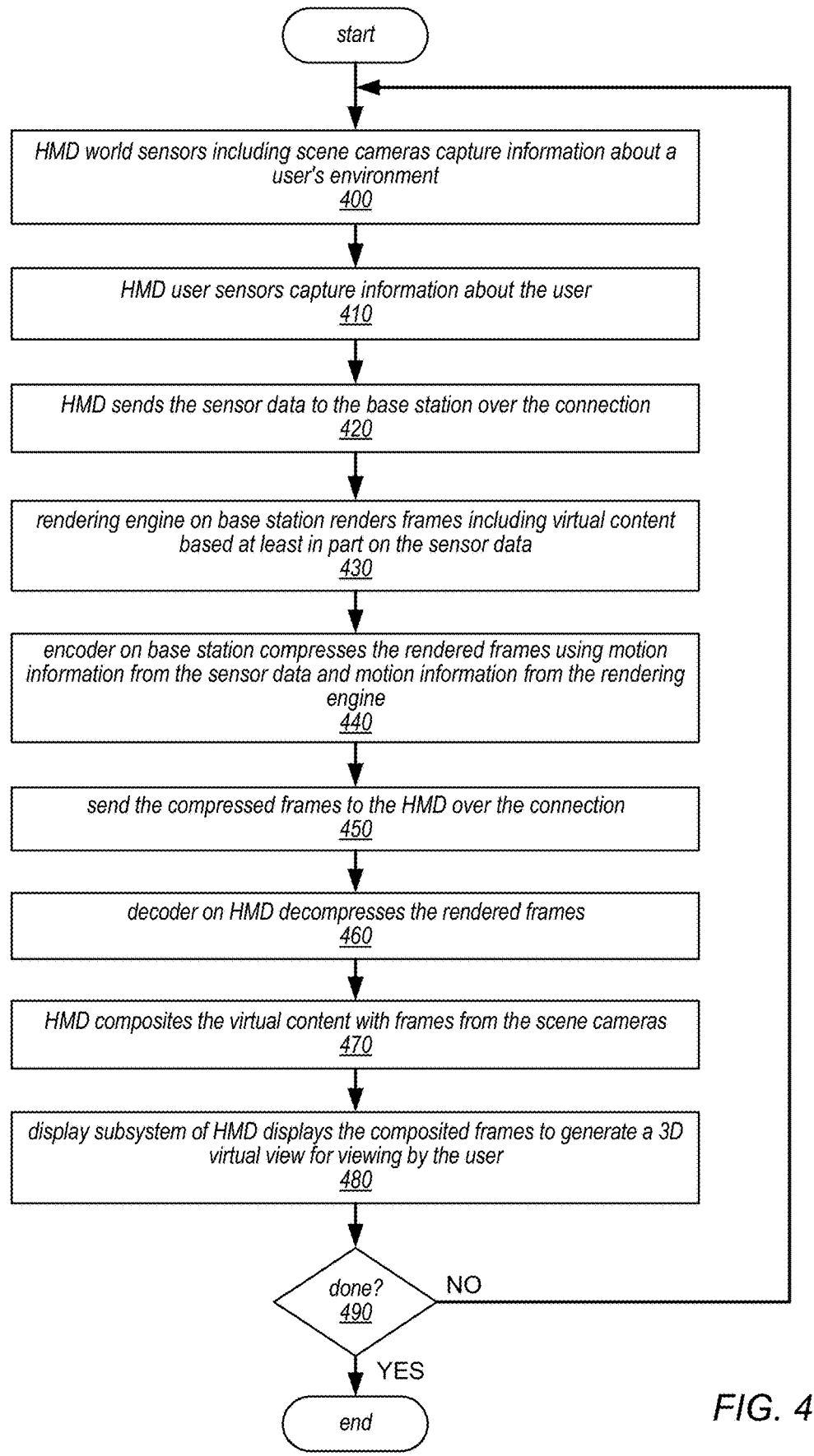
FIG. 4 is a flowchart of a method of operation for a mixed reality system in which rendered frames of virtual content received from the base station are composited with frames from the HMD scene cameras on the HMD, according to some embodiments.

FIG. 4 is a flowchart of a method of operation for a mixed reality system in which rendered frames of virtual content received from the base station are composited with frames from the HMD scene cameras on the HMD, according to some embodiments. The mixed reality system may include a HMD such as a headset, helmet, goggles, or glasses that includes a display component for displaying frames including left and right images to a user's eyes to thus provide 3D virtual views to the user. The 3D virtual views may include views of the user's environment augmented with virtual content (e.g., virtual objects, virtual tags, etc.). The mixed reality system may also include a base station configured to receive sensor inputs, including frames captured by cameras on the HMD as well as eye and motion tracking inputs, from the HMD via a wired or wireless connection, render frames including virtual content at least in part according to the sensor inputs, compress the frames, and transmit the compressed frames to the HMD via a connection through the interface for decompression, compositing, and display.

As indicated at 400, one or more world sensors on the HMD may capture information about the user's environment (e.g., video, depth information, lighting information, etc.), and provide the information as inputs to a controller of the HMD. As indicated at 410, one or more user sensors on the HMD may capture information about the user (e.g., the user's expressions, eye movement, head movement, hand gestures, etc.), and provide the information as inputs to the controller of the HMD. Elements 410 and 420 may be performed in parallel, and may be performed continuously to provide sensor inputs as the user uses the mixed reality system. As indicated at 420, the HMD sends at least some of the sensor data to the base station over the connection. In some embodiments, the controller of the HMD may perform some processing of the sensor data, for example compression and/or generation of motion information including but not limited to motion vectors for the user in the real environment, before transmitting the sensor data to the base station. As indicated at 430, the controller of the base station may implement a rendering engine that renders frames including virtual content based at least in part on the inputs from the world and user sensors received from the HMD via the connection. During rendering, the rendering engine may generate motion vectors for the rendered virtual content.

As indicated at 440, an encoder on the base station encodes/compresses the rendered frames prior to sending the frames to the HMD over the connection. The base station encoder may encode the frames according to a video encoding protocol (e.g., High Efficiency Video Coding (HEVC), also known as H.265, or MPEG-4 Part 10, Advanced Video Coding (MPEG-4 AVC), also referred to as H.264, etc.). In conventional encoding methods, a motion estimation component examines the movement of objects (more generally, the movement of pixels or blocks of pixels) in a sequence of two or more images (e.g., the current image and the previously encoded image, referred to as a reference image) to estimate motion vectors for the objects, and a motion compensation component uses the estimated motion vectors in performing data compression. In embodiments of the mixed reality system as described herein, an encoding method may be used in which, instead of using a previous frame as a reference frame to estimate motion vectors as is done in conventional encoders, motion vectors that have been determined from motion data captured by sensors on the HMD may be input to the encoder and used during motion compensation in encoding the current frame. In addition, in at least some embodiments, motion vectors for virtual content that have been determined by the rendering application on the base station when rendering the virtual content may be input to the encoder and used during motion compensation in encoding the current frame. Using the pre-determined motion vectors from the HMD and base station rendering application during motion compensation when encoding the current frame thus eliminates the motion estimation component, and saves the time it would take to estimate motion vectors using the previous frame.

In some embodiments, information used by the encoder when encoding a frame (e.g., the motion vectors received from the base station rendering application and/or from the HMD) may be embedded in the data stream along with the frame data and transmitted to the HMD over the connection. This information may, for example, be used by a rendering application on the HMD to synthesize a frame for display from a previously received frame if a current frame is not received from the base station.

As indicated at 450, the encoded frames are sent to the HMD over the wired or wireless connection. As indicated at 460, a decoder on the HMD decompresses the frames received from the base station. As indicated at 470, the HMD then composites the virtual content from the decompressed frames with frames from the HMD scene cameras. As indicated at 480, the composited frames are provided to a display subsystem of the HMD, which displays the frames to provide a 3D virtual view including the virtual content composited into a view of the user's environment for viewing by the user. As indicated by the arrow returning from element 490 to element 400, the base station may continue to receive and process inputs from the sensors to render frames to be encoded and transmitted to the HMD via the connection for decoding, compositing, and display by the HMD as long as the user is using the mixed reality system.

Figure 5:
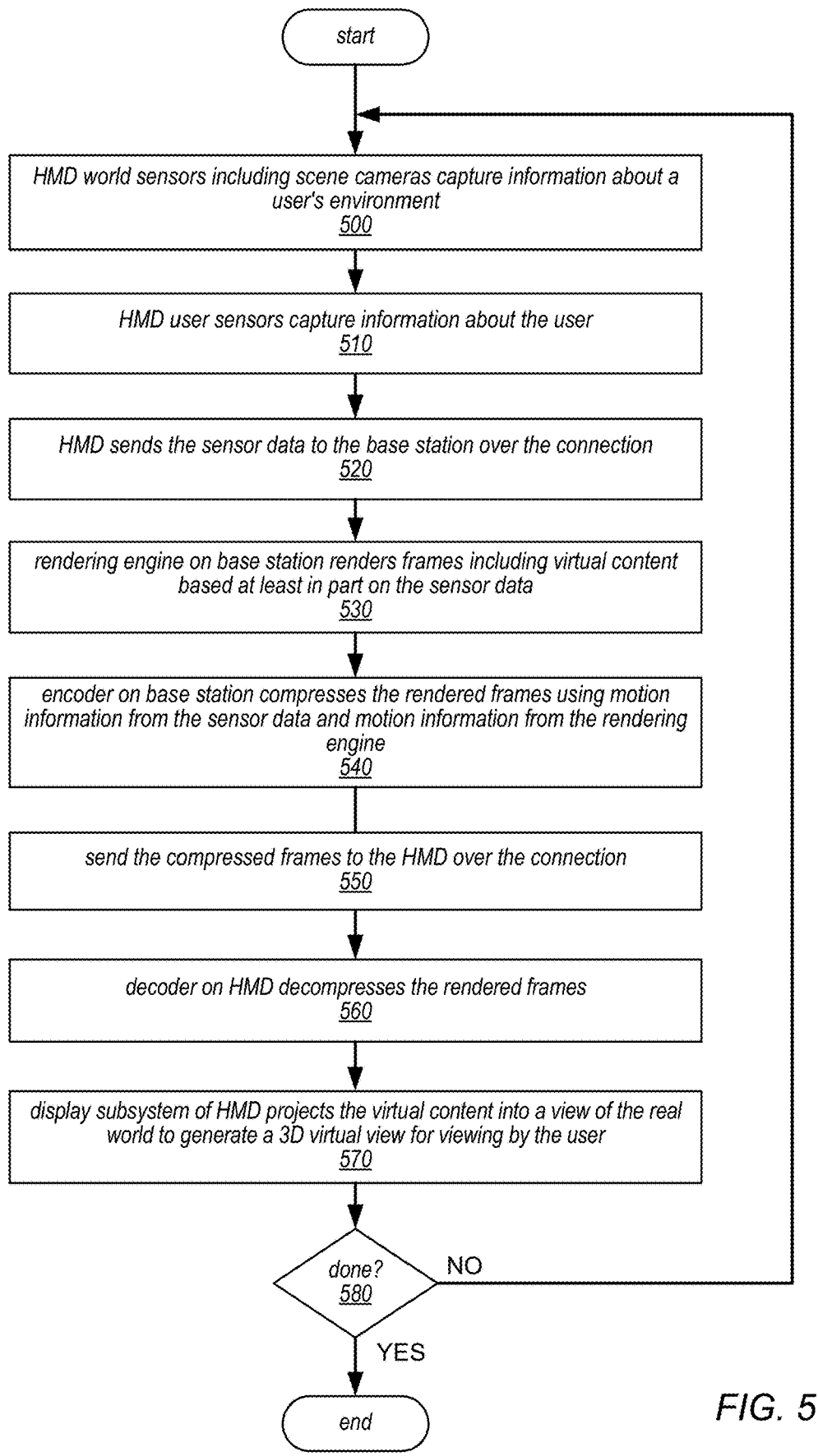
FIG. 5 is a flowchart of a method of operation for a mixed reality system in which rendered frames of virtual content received from the base station are overlaid on a real view of the environment, according to some embodiments.

FIG. 5 is a flowchart of a method of operation for a mixed reality system in which rendered frames of virtual content received from the base station are overlaid on a real view of the environment, according to some embodiments. Elements 500 through 560 of FIG. 5 may be performed in a similar fashion as elements 400 through 460 of FIG. 4.

As indicated at 500, one or more world sensors on the HMD may capture information about the user's environment and provide the information as inputs to a controller of the HMD. As indicated at 510, one or more user sensors on the HMD may capture information about the user and provide the information as inputs to the controller of the HMD. Elements 510 and 520 may be performed in parallel, and may be performed continuously to provide sensor inputs as the user uses the mixed reality system. As indicated at 520, the HMD sends at least some of the sensor data to the base station over the connection. As indicated at 530, the controller of the base station may implement a rendering engine that renders frames including virtual content based at least in part on the inputs from the world and user sensors received from the HMD via the connection. During rendering, the rendering engine may generate motion vectors for the rendered virtual content.

As indicated at 540, an encoder on the base station encodes/compresses the rendered frames prior to sending the frames to the HMD over the connection. The base station encoder may encode the frames according to a video encoding protocol (e.g., H.265, H.264, etc.). An encoding method may be used in which, instead of using a previous frame as a reference frame to estimate motion vectors as is done in conventional encoders, motion vectors that have been determined from motion data captured by sensors on the HMD and/or motion vectors for virtual content that have been determined by the rendering application on the base station may be input to the encoder and used during motion compensation in encoding the current frame. In some embodiments, the motion information used by the encoder when encoding a frame may be embedded in the data stream along with the frame data and transmitted to the HMD over the connection. As indicated at 550, the encoded frames are sent to the HMD over the wired or wireless connection. As indicated at 560, a decoder on the HMD decompresses the frames received from the base station.

As indicated at 570, the decompressed frames are provided to a display subsystem of the HMD, which projects the virtual content into a real view of the user's environment to provide a 3D view including the virtual content overlaid on the real view of the user's environment. As indicated by the arrow returning from element 580 to element 500, the base station may continue to receive and process inputs from the sensors to render frames to be encoded and transmitted to the HMD via the connection for decoding and display by the HMD as long as the user is using the mixed reality system.

Bandwidth and Latency Constraints on the Connection

Two primary constraints to be considered on the connection between the HMD and the base station in a mixed reality system as illustrated in FIGS. 1 through 5 are bandwidth and latency. A target is to provide a high resolution, wide field of view (FOV) virtual display to the user at a frame rate (e.g., 60-120 frames per second (FPS)) that provides the user with a high-quality MR view. Another target is to minimize latency between the time a video frame is captured by the HMD and the time a MR frame based on the video frame is displayed by the HMD.

In some embodiments, the motion information used by the encoder to encode a frame may be embedded in the data stream along with the frame. This motion information can be used by a rendering application on the HMD to synthesize a frame from a previously received frame if a current frame is not received from the base station.

Encoding Method

Embodiments of an encoding method are described that may be implemented by the encoder on the base station of the mixed reality system to reduce the time it takes to encode the rendered frames on the base station before transmitting the frames to the HMD via the connection. In the encoding method, instead of using a previous frame as a reference frame to compute motion vectors for pixels or blocks of pixels of a current frame being encoded as is done in conventional encoders, motion vectors that have been determined from motion data captured by sensors on the HMD may be input to the encoding method and used during motion compensation in encoding the current frame. In addition, in at least some embodiments, motion vectors for virtual content that have been determined by the rendering application on the base station when rendering the virtual content may be input to the encoding method and used during motion compensation in encoding the current frame. Using the pre-determined motion vectors from the HMD and rendering application when encoding the current frame saves the time it would take to estimate the motion vectors using the previous frame.

Figure 6:
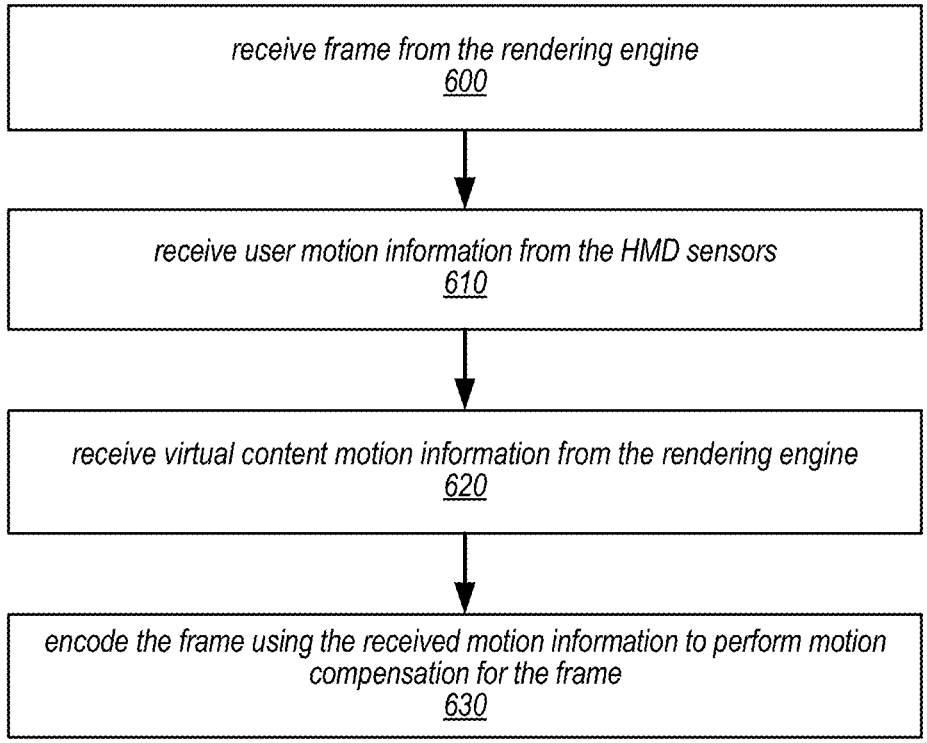
FIG. 6 is a high-level flowchart of a method for encoding frames using motion information from the HMD and base rendering application, according to some embodiments.

FIG. 6 is a high-level flowchart of a method for encoding frames using motion information from the HMD and base rendering application, according to some embodiments. The encoding method may be performed at elements 440 of FIG. 4 or 540 of FIG. 5. The method may be implemented by an encoder component of the base station as illustrated in FIG. 8. The base station encoder may be configured to encode the frames according to a video encoding protocol (e.g., H.265, H.264, etc.).

As indicated at 600, the base station encoder may receive frame data from the rendering engine/application on the base station. As indicated at 610, the encoder may receive user motion information from the HMD motion sensors. The user motion information may, for example, include head motion vectors estimated from head pose camera images augmented with IMU information on the HMD. As indicated at 620, the encoder may also receive virtual content motion information (e.g., motion vectors determined for the virtual content) from the rendering engine of the base station. As indicated at 630, the decoder may then encode the current frame using the received motion information to perform motion compensation for the frame.

The encoded frame may be sent to the HMD over the connection as shown at elements 450 of FIG. 4 or 550 of FIG. 5. In some embodiments, the motion information used by the encoder to encode a frame may be embedded in the data stream along with the frame data. This motion information may, for example, be used by a rendering application on the HMD to synthesize a frame from a previously received frame if a current frame is not received from the base station.

Embedding Motion Information in the Data Stream to the HMD Over the Connection

As previously described, the HMD receives encoded frames from the base station via the connection. The HMD includes a pipeline for decoding (e.g., decompression and expansion/upscale) and displaying the received frames. A goal is to maintain a target frame rate to the display of the HMD. Missing or incomplete frames are possible. In some embodiments, to maintain the target frame rate to the display, if a missing or incomplete frame is detected, a rendering application on the HMD may synthesize a frame from a previously received frame using the motion information that was embedded in the data stream. To synthesize the frame, content of the previous frame may be rotated or shifted based on the motion vectors from the previous frame. The synthesized frame may then be displayed by the HMD in place of the missing or incomplete current frame.

Figure 7:
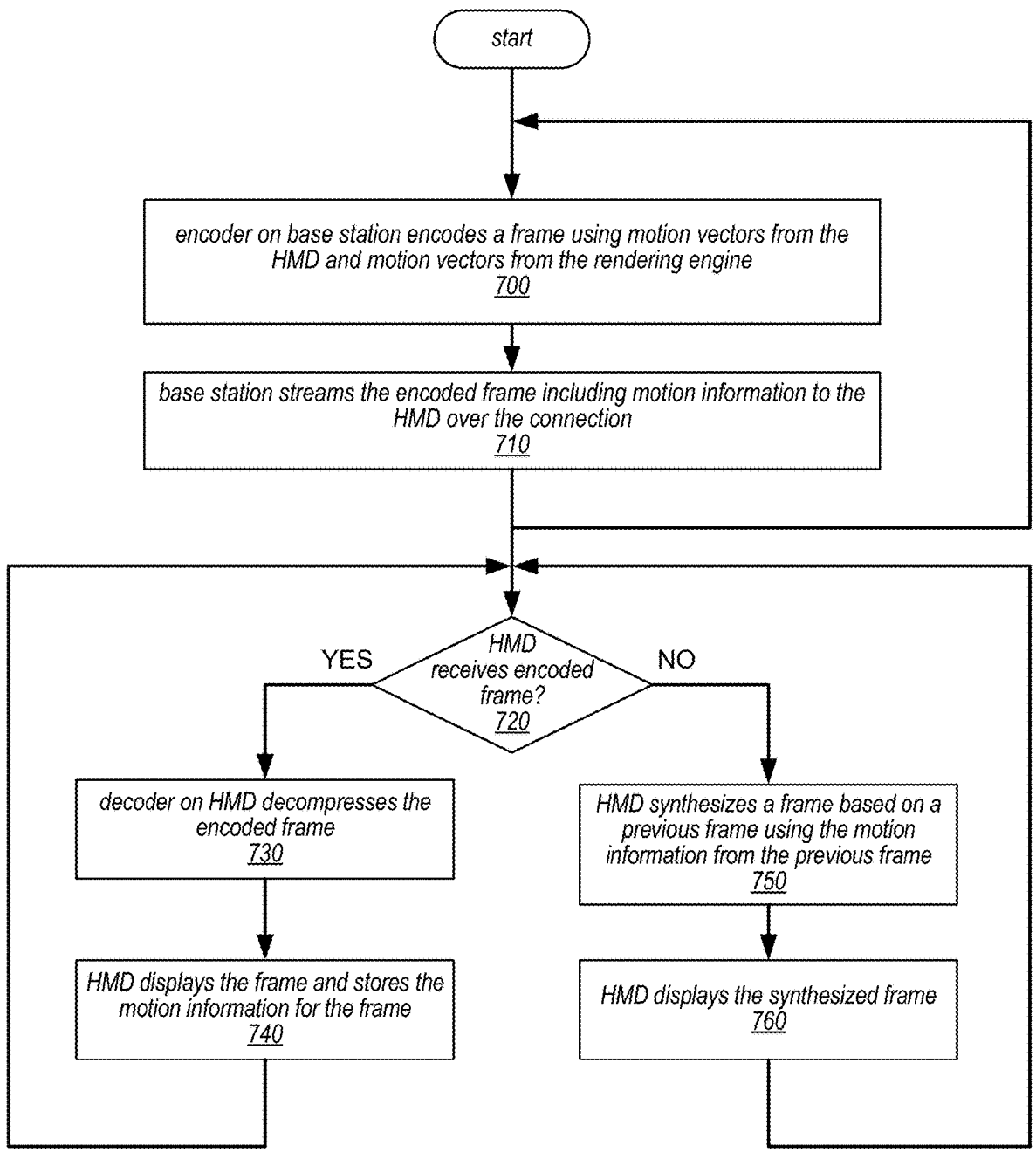
FIG. 7 is a flowchart of a method for processing and displaying frames on the HMD, according to some embodiments.

FIG. 7 is a flowchart of a method for processing and displaying frames on the HMD, according to some embodiments. As indicated at 700, an encoder on the base station of a mixed reality system encodes a frame, using motion vectors from the HMD and from the base station rendering application as motion estimates in performing motion compensation. As indicated at 710, the base station streams the encoded frame to the HMD over the wired or wireless connection, and includes the motion information used to encode the frame in the data stream. As indicated by the arrow returning from 710 to 700, the base station continues to render, encode, and stream frames while the user is using the mixed reality system.

At 720, if the HMD receives the encoded frame, then as indicated at 730, a decoder on the HMD decompresses the encoded frame. As indicated at 740, the HMD then processes (e.g., composites) and displays the frame. The HMD also stores the motion information for the frame. At 720, if the HMD does not receive an encoded frame or the encoded frame is incomplete, then as indicated at 750 the HMD synthesizes a frame from a previous frame using the motion information (e.g., motion vectors) from the previous frame to rotate or shift the frame data. As indicated at 760, the synthesized frame is displayed in place of the missing or incomplete current frame. As indicated by the arrows returning from elements 740 and 760 to element 720, the HMD continues to receive, process or synthesize, and display frames while the user is using the mixed reality system.

In some embodiments, the HMD may include two decoders (referred to as a current frame decoder and a previous frame decoder) and thus two decoding pipelines or paths that may operate substantially in parallel. Instead of simply decoding and storing the current frame for possible use as the previous frame, as the compressed frame data is received from the base station over the connection and begins to be processed on the current frame decoding path, the compressed current frame data is also written to a buffer on the previous frame decoding path. In parallel with the compressed current frame being processed on the current frame decoder path and written to the previous frame buffer, the compressed previous frame data is read from the previous frame buffer and processed on the previous frame decoder path that decodes (e.g., decompression and expansion/upscale) and rotates or shifts the previous frame based on the motion information that is embedded in the encoded frame. If the current frame is detected to be missing or incomplete, the frame that was processed on the previous frame decoder path may be displayed by the HMD in place of the missing or incomplete current frame.

Example Mixed Reality System

FIG. 8 is a block diagram illustrating functional components of and processing in an example mixed reality system as illustrated in FIGS. 1 through 7, according to some embodiments. A mixed reality system may include a HMD 2000 (a headset, helmet, goggles, or glasses worn by the user) and a base station 2060 (e.g., a computing system, game console, etc.). HMD 2000 and base station 2060 may each include a wired or wireless interface component (not shown) that allows the HMD 2000 and base station 2060 to exchange data over a connection 2080. In some embodiments, a wireless interface may be implemented according to a proprietary wireless communications technology (e.g., 60 gigahertz (GHz) wireless technology) that provides a highly directional wireless link between the HMD 2000 and the base station 2060. In some embodiments, the directionality and bandwidth (e.g., 60 GHz) of the wireless communication technology may support multiple HMDs 2000 communicating with the base station 2060 at the same time to thus enable multiple users to use the system at the same time in a co-located environment. However, other commercial (e.g., Wi-Fi, Bluetooth, etc.) or proprietary wireless communications technologies may be supported in some embodiments.

In some embodiments, HMD 2000 may include one or more scene cameras 2001 (e.g., RGB (visible light) video cameras) that capture high-quality video of the user's environment that may be used to provide the user with a virtual view of their real environment. In some embodiments there may be two scene cameras 2001 (e.g., a left and a right camera) located on a front surface of the HMD 2000 at positions that are substantially in front of each of the user's eyes. However, in various embodiments, more or fewer scene cameras 2001 may be used, and the scene cameras 2001 may be positioned at other locations.

The HMD 2000 may include sensors 2004. Sensors 2004 may include world sensors that collect information about the user's environment (e.g., video, depth information, lighting information, etc.), and user sensors that collect information about the user (e.g., the user's expressions, eye movement, gaze direction, hand gestures, head movement, etc.). Example sensors and are shown in FIG. 2.

In some embodiments, the world sensors may include one or more head pose cameras (e.g., IR or RGB cameras) that may capture images that may be used provide information about the position, orientation, and/or motion of the user and/or the user's head in the environment. The information collected by head pose cameras may, for example, be used to augment information collected by an inertial-measurement unit (IMU) of the HMD 2000 when generating position/prediction data, for example motion vectors for the user's head.

In some embodiments, the world sensors may include one or more world mapping or depth sensors (e.g., infrared (IR) cameras with an IR illumination source, or Light Detection and Ranging (LIDAR) emitters and receivers/detectors) that, for example, capture depth or range information (e.g., IR images) for objects and surfaces in the user's environment.

In some embodiments, the user sensors may include one or more gaze tracking sensors (e.g., IR cameras with an IR illumination source) that may be used to track position and movement of the user's eyes. In some embodiments, the gaze tracking sensors may also be used to track dilation of the user's pupils. In some embodiments, there may be two gaze tracking sensors, with each gaze tracking sensor tracking a respective eye.

In some embodiments, the user sensors may include one or more eyebrow sensors (e.g., IR cameras with IR illumination) that track expressions of the user's eyebrows/forehead. In some embodiments, the user sensors may include one or more lower jaw tracking sensors (e.g., IR cameras with IR illumination) that track expressions of the user's mouth/jaw. In some embodiments, the user sensors may include one or more hand sensors (e.g., IR cameras with IR illumination) that track position, movement, and gestures of the user's hands, fingers, and/or arms.

HMD 2000 may include a display 2020 component or subsystem that includes a display pipeline and display screen; the display 2020 component may implement any of various types of virtual reality projector technologies. For example, the HMD 2000 may include a near-eye VR projector that displays frames including left and right images on screens that are viewed by a user, such as DLP (digital light processing), LCD (liquid crystal display) and LCoS (liquid crystal on silicon) technology projectors. As another example, the HMD 2000 may include a direct retinal projector that scans frames including left and right images, pixel by pixel, directly to the user's eyes via a reflective surface (e.g., reflective eyeglass lenses). In some embodiments, the display screen may allow light from the user's environment to pass through while displaying virtual content provided by the projectors so that rendered frames of virtual content received from the base station 2060 are overlaid on a real view of the environment as seen through the display screen.

HMD 2000 may include one or more of various types of processors (system on a chip (SOC), CPUs, image signal processors (ISPs), graphics processing units (GPUs), coder/decoders (codecs) (e.g., decoder 2010), etc.) that may, for example perform initial processing (e.g., compression) of the information collected by sensors 2004 and/or scene cameras 2001 before transmitting the information vial the connection 2080 to the base station 2060, and that may also perform processing (e.g., decoding/compositing) of compressed frames received from the base station 2060 prior to providing provide the processed frames to the display 2020 subsystem for display.

In some embodiments, HMD 2000 may include a software application (referred to as a HMD application), configured to execute on at least one processor (e.g., a CPU) of the HMD 2000 to generate virtual content to be displayed in a 3D virtual view to the user by the HMD 2000.

Base station 2060 may include software and hardware (e.g., processors (system on a chip (SOC), CPUs, image signal processors (ISPs), graphics processing units (GPUs), coder/decoders (codecs) (e.g., encoder 2066), etc.), memory, etc.) configured to generate and render frames that include virtual content based at least in part on the sensor information received from the HMD 2000 via the connection 2080 and to compress and transmit the rendered frames to the HMD 2000 for display via the connection 2080.

Base station 2060 may include a software application 2062 (referred to as a base application), for example a mixed reality or virtual reality application, configured to execute on at least one processor (e.g., a CPU) of the base station 2060 to generate virtual content based at least in part on sensor data from the HMD 2000 to be displayed in a 3D virtual view to the user by the HMD 2000. The virtual content may include world-anchored content (generated virtual content anchored to the view of the user's environment) and head-anchored content (generated virtual content that tracks the motion of the user's head).

The following describes data flow in and operations of the mixed reality system as illustrated in FIG. 8.

Scene cameras 2001 of the HMD 2000 capture video frames of the user's environment. The captured frames may be initially processed, for example by an ISP on a SOC of the HMD 2000, compressed, and transmitted to the base station 2060 over the connection 2080. The base station 2060 may receive the compressed scene camera frames via the connection 2080, decompress the frames, and write the frame data to a frame buffer.

Head pose cameras of the HMD 2000 capture images that may be used provide information about the position, orientation, and/or motion of the user and/or the user's head in the environment. The head pose images may be passed to a head pose prediction process, for example executing on a SOC of the HMD 2000. The head pose prediction process may also obtain data from an inertial-measurement unit (IMU) of the HMD 2000. The head pose prediction process may generate position/prediction data (e.g., motion vectors) based on the head pose images and IMU data and send the position/ prediction data to the base station 2060 over the connection 2080.

Depth sensors of the HMD 2000 may capture depth or range information (e.g., IR images) for objects and surfaces in the user's environment. The depth images may be sent to a depth processing component of the base station 2060 over the connection 2080. In some embodiments, the depth images may be compressed by the HMD 2000 before they are transmitted to the base station 2060.

User sensors of the HMD 2000 may capture information (e.g., IR images) about the user, for example gaze tracking information and gesture information. The user tracking images may be sent to the base station 2060 over the connection 2080. In some embodiments, the user tracking images may be compressed by the HMD 2000 before they are transmitted to the base station 2060. At least some of the user tracking images may be sent to the base application 2062 for processing and use in rendering virtual content for the virtual view. In some embodiments, gaze tracking images captured by the gaze tracking sensors may be used to adjust the rendering of images to be projected, and/or to adjust the projection of the images by the projection system of the HMD 2000, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. In some embodiments, content of images in regions at which the user is not looking may be compressed more than content of the region around the point at which the user is currently looking, which may reduce bandwidth usage on the connection 2080 and help to maintain the latency target. In some embodiments, the information collected by the gaze tracking sensors may be used to match direction of the eyes of an avatar of the user to the direction of the user's eyes. In some embodiments, brightness of the projected images may be modulated based on the user's pupil dilation as determined by the gaze tracking sensors.

Base application 2062 reads scene camera frame data from the frame buffer. Base application 2062 also receives and analyzes sensor data received from sensors 2004. Base application 2062 may generate world-anchored and head-anchored content for the scene based at least in part on information generated by the analysis of the sensor data. The world-anchored content may be passed to a world-anchored content processing pipeline, for example implemented by a GPU 2064 of the base station 2060. The head-anchored content may be passed to a head-anchored content processing pipeline, for example implemented by a GPU 2064 of the base station 2060. Outputs (e.g., rendered frames) of the world-anchored content processing pipeline and the head-anchored content processing pipeline may be passed to a composite/alpha mask process, for example implemented by a GPU 2064 of the base station 2060. The composite/alpha mask process may composite the frames received from the pipelines, and pass the composited frames to an encoder 2066 component of the base station 2060.

Encoder 2066 encodes/compresses the frames according to a video encoding protocol (e.g., H.265, H.264, etc.) using motion vectors 2070 received from the HMD and motion vectors 2072 received from the base station rendering application 2062. In embodiments of the mixed reality system as described herein, encoder 2066 may implement an encoding method in which, instead of using a previous frame as a reference frame to estimate motion vectors as is done in conventional encoders, motion vectors 2070 and 2072 may be input to the encoder 2066 and used during motion compensation in encoding the current frame. Using the pre-determined motion vectors 2070 and 2072 during motion compensation when encoding the current frame thus eliminates the motion estimation component, and saves the time it would take to estimate motion vectors using the previous frame.

The encoded frames are then transmitted to the HMD 2000 over the connection 2080. In some embodiments, information used by the encoder 2066 when encoding a frame (e.g., motion vectors 2070 and 2072) may be embedded in the data stream along with the frame data and transmitted to the HMD 2000 over the connection 2080. This information may, for example, be used by a rendering application 2030 on the HMD 2000 to synthesize a frame for display from a previously received frame if a current frame is not received from the base station 2060.

At the HMD 2000, the encoded frames received from the base station 2060 are passed to decoder 2010, which decodes/decompresses the frames. The HMD 2000 then processes the decoded frames and passes the processed frames to display 2020 component to be displayed to the user. In some embodiments, a composite/alpha mask 2012 component of the HMD 2000 may composite the frames received from the base station 2060 with frames captured by the scene cameras 2001 before passing the frames to display 2020. IF the HMD 2000 does not receive an encoded frame or the encoded frame is incomplete, then an application 2030 of the HMD 2000 may synthesize a frame from a previous frame using the motion information (e.g., motion vectors) from the previous frame to rotate or shift the frame data. The synthesized frame is then processed and passed to display 2020 in place of the missing or incomplete current frame.

In some embodiments, the HMD 2000 may include two decoders (referred to as a current frame decoder (decoder 2010) and a previous frame decoder (not shown)) and thus two decoding pipelines or paths that may operate substantially in parallel. In these embodiments, the encoded frames received from the base station 2060 are passed to decoder 2010, and are also written to a previous frame buffer. In parallel with the processing of the current frame in the current frame decoding pipeline, the previous frame is read from the previous frame buffer and processed (decoding, expansion/upscale, and rotation based on the motion information that is embedded in the encoded frame) by the previous frame decoding pipeline. If the current frame being processed by the current frame decoding pipeline is good, then the current frame is selected for display. If the current frame is determined to be missing or incomplete, the previous frame output by the previous frame decoding pipeline, which was rotated to match predicted motion of the user based on the motion information embedded in the encoded frame, may be selected and displayed in place of the missing or incomplete current frame.

In some embodiments, the HMD 2000 may be configured to function as a stand-alone device as a fallback position if the connection 2080 with the base station 2060 is lost and thus frames are not received from the base station 2060. This may, for example, be done for safety reasons so that the user can still view the real environment that they are in even if the base station 2080 is unavailable. Upon detecting that the connection 2080 has been lost, frames captured by the scene cameras 2001 may be routed to a direct-to-display processing pipeline of the HMD 2000 to be displayed. In some embodiments, HMD application 2030 may generate virtual content to be composited 2012 into the frames and displayed in the virtual view, for example a message informing the user that the connection 2080 has been lost.

Layer-Based Rendering and Encoding

Embodiments of the mixed reality system as described herein may include a base station and a HMD, with the base station and HMD each implementing an interface via which a wireless or wired connection may be established. The fact that the mixed reality system includes both ends (the base station and HMD) and includes and implements the wireless or wired interface between the base station and HMD allows the mixed reality system to implement features that may not be available in conventional mixed reality systems. For example, as previously mentioned, motion information (e.g., motion vectors) or other information may be provided to and used by components (e.g., an encoder component) of the base station, and motion information used by the decoder component may be embedded in the data stream with the compressed rendered frame data sent to the HMD from the base station and used by components of the HMD. Examples of other features that may be included in embodiments of the mixed reality system are described below.

Layer-Based Rendering, Encoding, Decoding, and Processing

In some embodiments, the base station may render frames as two or more layers, for example a base layer and one or more layers at different depths overlaid on the base layer (e.g., a virtual object may be rendered in an overlay layer). The rendered layers may each be encoded and streamed to the HMD as a "frame". Motion vectors corresponding to the layers may be sent to the HMD with the frame. On the HMD, the encoded frame may be decoded to extract the layers and respective motion vectors. The HMD may then composite the layers with a frame from the scene camera of the HMD, or alternatively may synthesize a frame using the layers and respective motion vectors. Encoding the frame as two or more layers rather than as a single composited layer may, for example, allow the HMD to move an overlay layer (e.g., a virtual object) according to the respective motion vectors when compositing or rendering a frame without leaving a "hole" in underlying layer(s) as would occur if the frame was encoded as a single composited layer.

Variable Degrees of Compression

In some embodiments, the encoder component of the base station may apply variable degrees of compression to different regions of a frame. In some embodiments, the sensor data received by the base station from the HMD may be used to identify important regions or objects in the scene, and to differentiate these important regions or objects from background (less important) content. The rendering engine may leverage this information to render content in important regions with more detail/at higher resolution than content in less important regions. The encoder may leverage this information to selectively compress background (less important) content to a higher degree than the regions or objects that are identified as important.

In some embodiments, the motion information received by the encoder component may be leveraged to add a fourth dimension (time) to the variable compression process. For example, in some embodiments, content of a frame in a region around the location at which the user's eyes are currently looking based on gaze tracking information may be compressed less (and thus provide higher resolution when displayed) than content in regions at which the user is not currently looking. Using the motion vectors for the frame, a next location at which the user may be looking may be predicted. A region of the frame at that next location may be compressed at the higher resolution and added to the data stream for the frame. The HMD may then use the higher resolution data for the region of the frame at the next location that was included in the data stream with the frame when compositing or synthesizing a next frame.

Rendering Scene Camera Frames on the Base Station

Embodiments are generally described as rendering frames of virtual content on the base station based on scene camera frames and sensor data received from the HMD over the connection, encoding the rendered frames, and sending the encoded frames to the HMD over the connection. On the HMD, the encoded frames are decoded and composited with frames obtained from the scene camera. In these embodiments, the scene camera frames are not rendered or encoded on the base station, and are not sent to the base station with the encoded rendered frames of virtual content. However, in some embodiments, the scene camera frames may be processed or re-rendered by a rendering application on the base station, for example to change colors or other aspects of the images of the scene. The re-rendered scene camera frames may then be encoded by the encoder and streamed to the HMD with the encoded rendered frames of virtual content. For example, a re-rendered scene camera frame may be streamed as the base layer for the frame. The HMD may then composite the layers (including the re-rendered scene camera frame) and provide the composited frame to the display subsystem for display.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a device comprising one or more processors; and
a head-mounted display (HMD), comprising:
one or more cameras configured to capture frames that include views of a user's environment;
one or more sensors configured to capture data about the user and the user's environment; and a display subsystem for displaying a 3D virtual view to the user;

wherein the HMD is configured to:
   transmit the frames captured by the cameras to the device over a connection; and
   transmit the sensor data to the device over the connection;

wherein the device is configured to:
   render frames that include virtual content based at least in part on the frames and the sensor data received from the HMD;
   encode the rendered frames according to a video encoding protocol, wherein, to encode the rendered frames, an encoder component of the device is configured to compress the rendered frames using head motion vectors received from the HMD in the sensor data; and
   transmit the encoded frames to the HMD over the connection;

wherein the HMD is configured to decode the encoded frames received from the device and provide the rendered frames to the display subsystem for display.

2. The system as recited in claim 1, wherein, to encode the rendered frames, the encoder component is further configured to compress the rendered frames using virtual object motion vectors for the virtual content received from a rendering engine of the device in addition to the head motion vectors.

3. The system as recited in claim 2, wherein the device is further configured to transmit the motion vectors used to compress the rendered frames to the HMD over the connection with the respective encoded frames.

4. The system as recited in claim 3, wherein the HMD is further configured to:
   monitor the receiving of the encoded frames from the device over the connection and the decoding of the encoded frames by a decoder component of the HMD to detect missing or incomplete frames; and
   upon detecting that a current frame is missing or incomplete, synthesize a frame based on a previously received frame and provide the synthesized frame to the display subsystem for display in place of the missing or incomplete current frame;
   wherein, to synthesize the frame, the HMD is configured to rotate the previously received frame according to the motion vectors received from the device with the encoded frame.

5. The system as recited in claim 1, wherein the one or more sensors include:
   one or more head pose cameras configured to track the user's position and motion in the environment; and
   an inertial-measurement unit (IMU);
   wherein the HMD is configured to generate the head motion vectors based on images captured by the one or more head pose cameras augmented with information received from the IMU.

6. The system as recited in claim 1, wherein the connection is a wireless connection.

7. The system as recited in claim 1, wherein the HMD is further configured to composite the rendered frames with the frames captured by the cameras before providing the rendered frames to the display subsystem for display.

8. A method, comprising:
   capturing, by one or more cameras of a head-mounted display (HMD) worn by a user, frames that include views of the user's environment;
   capturing, by one or more sensors of the HMD, data about the user and the user's environment;
   transmitting the frames and sensor data to an external device over a connection;
   rendering, by the external device, frames that include virtual content based at least in part on the frames and the sensor data received from the HMD;
   encoding, by the external device, the rendered frames according to a video encoding protocol, wherein encoding a rendered frame comprises compressing the rendered frame using head motion vectors received from the HMD in the sensor data and virtual object motion vectors for virtual content in the rendered frame received from a rendering engine of the external device;
   transmitting the encoded frames to the HMD over the connection;
   decoding, by the HMD, the encoded frames received from the external device; and
   displaying, by the HMD, the rendered frames to the user to provide a 3D virtual view of the user's environment that includes the virtual content.

9. The method as recited in claim 8, further comprising transmitting the motion vectors used to compress the frames to the HMD over the connection with the respective encoded frames.

10. The method as recited in claim 9, further comprising:
   monitoring, by the HMD, the receiving of the encoded frames from the external device over the connection and the decoding of the frames by a decoder component of the HMD to detect missing or incomplete frames; and
   upon detecting that a current frame is missing or incomplete, synthesizing a frame based on a previously received frame, wherein synthesizing the frame comprises rotating the previously received frame according to the motion vectors received from the external device with the encoded frame; and
   displaying the synthesized frame in place of the missing or incomplete current frame.

11. The method as recited in claim 8, wherein the HMD is configured to generate the head motion vectors based on images captured by one or more head pose cameras augmented with information received from an inertial-measurement unit (IMU).

12. The method as recited in claim 8, wherein the connection is a wireless connection.

13. The method as recited in claim 8, further comprising compositing, by the HMD, the rendered frames with the frames captured by the cameras before displaying the frames.

14. A device, comprising:
   one or more processors;
   one or more cameras configured to capture frames that include views of a user's environment;
   one or more sensors configured to capture data about the user and the user's environment; and
   a display subsystem;
   wherein at least one of the one or more processors of the device is configured to generate head motion vectors based on sensor data captured by the sensors;
   wherein the device is configured to:
      transmit the frames captured by the cameras to an external device over a connection;
      transmit the sensor data including the head motion vectors to the external device over the connection;

receive encoded rendered frames from the external device over the wireless connection, wherein the rendered frames include virtual content rendered by the external device based at least in part on the frames captured by the cameras and the sensor data; and receive motion vectors used to compress the rendered frames from the external device over the wireless connection;

wherein at least one of the one or more processors of the device is configured to decode the encoded rendered frames received from the external device; and wherein the display subsystem is configured to display the rendered frames to the user to provide a 3D virtual view of the user's environment that includes the virtual content.

15. The HMD device as recited in claim 14, wherein the device is further configured to:

monitor the receiving of the encoded frames from the external device over the connection and the decoding of the encoded frames to detect missing or incomplete frames; and upon detecting that a current frame is missing or incomplete, synthesize a frame based on a previously received frame and provide the synthesized frame to the display subsystem for display in place of the missing or incomplete current frame;

wherein, to synthesize the frame, the device is configured to rotate the previously received frame according to the motion vectors received from the external device with the encoded frame.

16. The device as recited in claim 14, wherein the one or more sensors include:

one or more head pose cameras configured to track the user's position and motion in the environment; and an inertial-measurement unit (IMU);

wherein the at least one of the one or more processors of the device is configured to generate the head motion vectors based on images captured by the one or more head pose cameras augmented with information received from the IMU.

17. The device as recited in claim 14, wherein the connection is a wireless connection.

18. The device as recited in claim 14, wherein at least one of the one or more processors of the device is configured to composite the rendered frames with the frames captured by the cameras before providing the rendered frames to the display subsystem for display.

19. A device, comprising:

one or more processors; and a memory comprising program instructions executable by the one or more processors to:

receive frames from a head-mounted display (HMD) via a connection, wherein the frames include views of an environment captured by one or more cameras of the HMD;

receive sensor data captured from a user of the HMD and the user's environment by a plurality of sensors from the HMD via the connection;

render, by a rendering process executing on at least one of the one or more processors, frames that include virtual content based at least in part on the frames and the sensor data received from the HMD;

encode, by an encoder process executing on at least one of the one or more processors, the rendered frames according to a video encoding protocol, wherein, to encode the rendered frames, the encoder process is configured to compress the rendered frames using head motion vectors received from the HMD in the sensor data and virtual object motion vectors for virtual content in the rendered frame received from the rendering process; and transmit the encoded frames to the HMD over the connection.

20. The device as recited in claim 19, wherein the program instructions are further executable by the one or more processors to transmit the motion vectors used to compress the frames to the HMD over the connection with the respective encoded frames.

21. The device as recited in claim 19, wherein the connection is a wireless connection.

* * * * *